(12) United States Patent
Huber

(10) Patent No.: US 6,926,481 B2
(45) Date of Patent: Aug. 9, 2005

(54) MOUNTING APPARATUS FOR A TRANSPORTATION SYSTEM

(75) Inventor: Thomas Huber, Schliersee (DE)

(73) Assignee: Telair International GmbH, Miesbach (DE)

(*) Notice: Subject to any disclaimer, the term of this patent is extended or adjusted under 35 U.S.C. 154(b) by 0 days.

(21) Appl. No.: 10/354,510

(22) Filed: Jan. 29, 2003

(65) Prior Publication Data

US 2003/0156914 A1 Aug. 21, 2003

(30) Foreign Application Priority Data

Feb. 13, 2002 (DE) .......................... 102 05 871

(51) Int. Cl.[7] .................................................. B60P 7/08
(52) U.S. Cl. ............................ 410/80; 410/77; 410/92
(58) Field of Search ............................. 410/77, 80, 79, 410/92, 104, 105; 248/500, 503; 244/118.1, 137.1; 414/536

(56) References Cited

U.S. PATENT DOCUMENTS

| | | | | |
|---|---|---|---|---|
| 3,800,713 A | * | 4/1974 | Nordstrom | 410/79 |
| 4,121,789 A | * | 10/1978 | Lent et al. | 410/77 |
| 4,144,821 A | * | 3/1979 | Lang | 410/79 |
| 5,337,979 A | * | 8/1994 | Bales et al. | |
| 5,564,654 A | | 10/1996 | Nordstrom | |
| 5,816,758 A | | 10/1998 | Huber | 410/77 |
| 5,871,317 A | | 2/1999 | Huber et al. | 410/79 |
| 5,871,318 A | * | 2/1999 | Dixon et al. | 410/105 |
| 6,425,717 B1 | * | 7/2002 | Saggio et al. | 410/79 |
| 6,485,238 B2 | * | 11/2002 | Segura | 410/69 |
| 6,488,457 B2 | * | 12/2002 | Diamante | 410/84 |

FOREIGN PATENT DOCUMENTS

| | | |
|---|---|---|
| DE | 2 161 735 | 7/1972 |
| DE | 42 10 703 A1 | 10/1993 |
| DE | 195 44 796 C1 | 5/1997 |
| DE | 196 34 791 | 12/1997 |
| DE | 199 62 810 A1 | 7/2001 |

* cited by examiner

Primary Examiner—Stephen Gordon
(74) Attorney, Agent, or Firm—Merchant & Gould P.C.

(57) ABSTRACT

Various kinds of apparatus are known for mounting functional units of conveyor systems, in particular latch units, which can be installed on the floor of a cargo hold in an aircraft. They are provided with detachable fixation devices to fix the functional units to retaining devices attached to the floor, such as seat rails or lock trays. In order to make better use of a cargo hold without the need for installing special fixation devices on its floor, it is proposed to equip the mounting apparatus with a support base that comprises, on opposite sides thereof, different fixation devices, a first of which can be fixed to a first kind of retaining device, such as a seat rail, while simultaneously a second fixation device can be fixed to a second kind of retaining device, such as a lock tray.

24 Claims, 1 Drawing Sheet

US 6,926,481 B2

MOUNTING APPARATUS FOR A TRANSPORTATION SYSTEM

RELATED U.S. APPLICATIONS

Not Applicable.

STATEMENT REGARDING FEDERALLY SPONSORED RESEARCH OR DEVELOPMENT

Not Applicable.

REFERENCE TO MICROFICHE APPENDIX

Not Applicable.

FIELD OF THE INVENTION

The invention relates to a mounting apparatus for functional unit of a transportation system such as a latch unit, a guide means or a conveyor means, that can be attached to a floor of a cargo hold in an aircraft.

BACKGROUND OF THE INVENTION

Cargo aircraft customarily load items of freight in "single row", "side by side" or "triple row" configuration. That is, the freight items are stored next to one another in arrays oriented in the long direction of the cargo hold within the aircraft fuselage, such that the arrays can comprise one, two or three rows. There are also variants of this scheme, in particular "multiple choice systems" that allow two or three combinations simultaneously. The single-row array is customarily always disposed down the middle along the center line of the aircraft, because in this way it is possible not only to solve the weight/balance problem, i.e. to position the center of gravity as desired, but also to place the freight items where the greatest vertical space is available.

In B 747 freighters so far only the side-by-side configuration has been possible. When items of freight are to be loaded along the center line of the aircraft, it has previously been necessary to take the elaborate measure of lashing them down to the floor with retaining belts fastened to the seat rails. In the case of heavy loads, such as engine pallets, this operation can take up to several hours for each pallet. Furthermore, the region around these freight items (which in such cases are most often pallets) is no longer usable because it is occupied by the retaining belts, which run downward at an angle.

A major problem here is that although adapters and structures especially designed for retaining such equipment could be installed in the floor of the cargo hold, this would require substantial structural alterations and be enormously expensive.

One possible means of solving this problem when voluminous and heavy loads are to be stored is provided by a system along the lines of a spider web: that is, a network of extruded profiles distributed over the floor of the cargo hold, between the parts of the cargo-storage system that are already present, and installed there as a means of fixing these loads in position. However, such a system causes a blockage in the region around the freight items that are to be secured, so that on one hand the space next to the region into which such an item is loaded cannot be used for anything else, and furthermore the "spider-web system" must be disassembled in order to fill or empty the remaining storage space in the aircraft.

Particularly important parts of an aircraft (especially the B 747) are the region ahead of the side cargo-loading door and behind the door in the nose, and, in all aircraft, the storage space above the wing box, because this space can hold almost twice the weight per item of freight as the rest of the cargo area. For the above reasons, i.e. in particular for reasons of the limitations on installation of retaining devices imposed by the builders of the aircraft, the fixation of freight items in these regions, in particular along the center line, is necessarily uneconomical.

BRIEF SUMMARY OF THE INVENTION

It is an object of the present invention to provide a mounting apparatus that enables an increased versatility of the currently available retaining devices during fixation, and hence enhances the usability of a standard aircraft cargo hold.

According to the present invention there is provided a mounting apparatus for a functional unit of a transportation system which can be attached to the floor of a cargo hold in an aircraft by means of a retaining device attached to the floor, and comprising a support base provided on opposite sides thereof with different fixation devices, a first of which is attachable to a first type of retaining device and a second of which is attachable to a second type of retaining device different to the first type of retaining device.

Hence, the user is not restricted, as is customary, to employing only mounting apparatus for functional units, in particular latch units and means for guidance or transport, that is provided in a particular form by the aircraft manufacturer, such as seat rails (see, e.g., U.S. Pat. No. 5,816,758) or so-called lock trays (see, e.g., U.S. Pat. No. 5,871,317); instead, various kinds of retaining devices that are customarily provided in aircraft can be used for mounting the support base. The support base in accordance with the invention builds, so to speak, a bridge between the diverse retaining devices, such that the functional units can be mounted at any position on the support base, achieving a variable adaptation to the items of freight that are to be secured.

Thus the support base bridges the space between the two retaining devices, thereby providing the above-mentioned freedom of choice regarding dimensions.

Preferably, the two fixation devices are constructed to receive loads that arrive, at least in part, from different directions. When, as preferably provided, the first retaining device is a seat rail and the second retaining device is a lock tray, the rails can support lateral as well as vertical loads, i.e. those acting perpendicular to the floor of the cargo hold, whereas the lock trays can only support forces acting in the long direction of the aircraft or perpendicular to the cargo-hold floor. However, because the support bases are attached to both retaining devices and the functional units can be positioned according to the desired load-bearing capability, items that load the apparatus from whatever direction is necessary can be thereby secured.

The support bases preferably comprise an adapter provided with a predetermined spacing raster, so that the attachment points of a functional unit mounted on the support base can be spatially subdivided according to predetermined raster proportions of the first and second retaining devices, for adaptation to a predetermined dimension of a freight item. Typical freight items are pallets, which along their long axis comprise locking slots that are 3.5" wide with a 20.125" spacing. The seat rails, however, like the lock trays, have only a standard 1" spacing. With the adapter the functional units, in particular latch units, can be variably positioned in the base plate. Preferably each such displaceable part (i.e., functional unit) is provided with 16 bores, of which eight are situated on each side. All these bores are equipped with a threaded rod having a cylindrical projection. The support bases in turn comprise bores, but only four per side. The distribution of the 16 threaded-rod bores with respect to the total of eight bores on the support base is preferably made such that the functional unit, i.e. in particular a latch unit, can be shifted within the support base according to a 0.25-inch raster, depending on which of the threaded rods have been "screwed down". Because preferably only every second functional unit is constructed as a latch, the latches being used are distributed according to the associated locking slots on the freight item, or pallet, with a spacing of 40.25". As a result of the 1-inch spacing of the lock trays and the fact that the functional units can be shifted in a 0.25-inch raster, it is possible to achieve the desired spacing relative to the standardized pallet slots or fixation elements on the freight items. A degree of tolerance is further achievable, for example in the case of latch units, by making their locking claw narrower, for example 1.25", than the corresponding locking slot in the freight item or pallet, for example 3.5". This means that such latch elements can be installed according to either a 20-inch or a 21-inch raster.

Preferably, at least one of the two fixation devices comprises a plurality of individual fixation elements, each of which can be coupled individually into fixation counterparts on the retaining devices. With this embodiment it is possible, for example, to undertake fixation to a lock tray even when a pallet latch or a PDU (power drive unit) is incorporated into the lock tray. When an individual fixation element happens to be apposed to a fixation counterpart, e.g. a bore, at which a fixation device belonging to the PDU is already present, that particular element is not "activated", whereas the elements at positions in the fixation raster opposed to "free" fixation counterparts (bores) are coupled thereto.

Preferably, the individual fixation elements are capable of being independently coupled or inactivated; that is, for example, they are constructed as spring-loaded pins or similar movable fixation elements to engage with openings/bores that constitute the fixation counterparts of the associated retaining devices. This measure enables particularly simple installation.

Preferably, on at least one of the two sides of the support base both fixation devices are installed, so that either can be used as desired. Then the support base can also be turned around, so as to ensure its versatility in a simple manner.

Preferably, the support base comprises mounting apparatus for conveyor means, in particular ball elements, in addition to the other standard functional units such as, in particular, latch units. This feature improves the arrangement and enhances its utility.

The mounting apparatus is preferably constructed as a "kit" and comprises several support bases, in which two kinds of latch units are provided, e.g. some fixed and others that can be swiveled away, or latches to fix freight items with respect to certain movements, which can be attached in the direction of the two opposed sides of the support base and also perpendicular to this direction. By this means one and the same kind of support base can be used to produce complete fixation of a freight item even in those regions where ordinarily no means of fixation are provided, for instance in the center-line region.

Hence, the aforementioned object is achieved by the use of mounting apparatus according to the present invention.

The present invention will now be described by way of example with reference to the accompanying drawing.

DETAILED DESCRIPTION OF THE INVENTION

Figure 1:
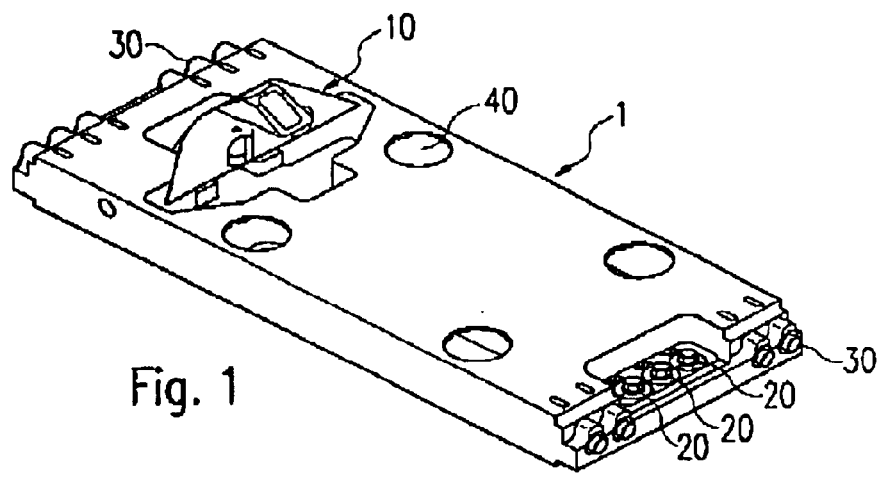
FIG. 1 is a perspective view of a first embodiment of a mounting apparatus according to the present invention.

In the following description, the same reference numerals are used for identical parts or parts with identical actions.

As shown in FIG. 1, the mounting apparatus comprises a support base 1, which is constructed as a substantially rectangular plate. In the support base 1 is disposed a functional unit 10 of a transportation system, which in the example shown in FIG. 1 is a latch with a lug that can be swiveled away (when contacted by an object approaching from the side). Such latches are generally known.

On one of its narrow sides first fixation devices 20 are provided, namely bolts that can be anchored in seat rails, such as are known from patent DE 195 25 392 A1. On the opposite side are disposed two fixation devices 30 that can be engaged by insertion into bores within so-called lock trays, which are customarily used on the floor of cargo aircraft for the mounting of power drive units, latch units or other functional units. The said bores are disposed on the side faces of these lock trays with a 1-inch spacing. So that a support base can also be coupled to a lock tray at the same site where, for example, a power drive unit is already installed, causing one or another of the bores in the lock tray to be "occupied", the pins forming part of the second fixation devices 30 are seated in the support base 1 so that they can be shifted and forced away by a spring (not shown). Hence when such a fixation pin encounters an "occupied" bore in the lock tray, it is pushed back into the support base 1, while the remaining fixation pins are caught in the lock-tray bores.

In the support base 1 are further disposed ball elements 40 that constitute a transport means for items of freight. These allow the mounting apparatus to be used simultaneously for another purpose.

In order to install such a mounting apparatus, first a lock tray that has not yet been fixed in place is pulled outward; then the mounting apparatus with its pins is guided from outside to or into the lateral bores on the lock tray; and finally the lock tray is pushed from outside towards the mounting apparatus, which has now been positioned, until the spring-loaded pins catch in the bores and the lock tray is likewise again seated in its resting position on the floor. In this way the mounting apparatus can be fixed in place between two lock trays.

When a mounting apparatus is to be attached between a lock tray and a seat rail, first the mounting apparatus is introduced so that its second fixation devices 30, i.e. the pins, are introduced into the bores in the lock tray and then lowered, so that the first fixation devices 20 can be locked into place in the seat rails.

Figure 2:
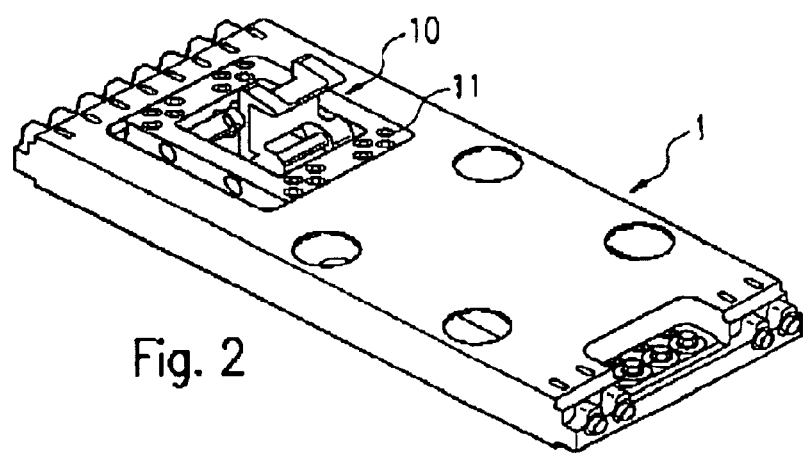
FIG. 2 is perspective view of a second embodiment of a mounting apparatus according to the invention.

The embodiment of the mounting apparatus shown in FIG. 2 differs from that in FIG. 1 first in the nature of the latch 10 incorporated there. Here the latch, although it can be depressed, is otherwise rigidly fixed in place, and furthermore it is adjustably attached within an aperture in the support base 1. The latter feature is implemented by (in this exemplary embodiment a total of 16) bores, within which are seated threaded rods 11 with a cylindrical projection. In the support base 1 bores are likewise disposed, but only four per side, and the spacing of the 16 threaded-rod bores with respect to the total of 8 bores in the support base is such that the latch unit 10 can be mounted in the support base so as to be shifted according to a 0.25-inch raster, depending on which ones of the threaded rods 11 are screwed in. This feature makes it possible, despite the larger scale (1") of the rasters of lock trays and seat rails, to produce an adaptation to different standards of the freight items, as has already been described above.

Figure 3:
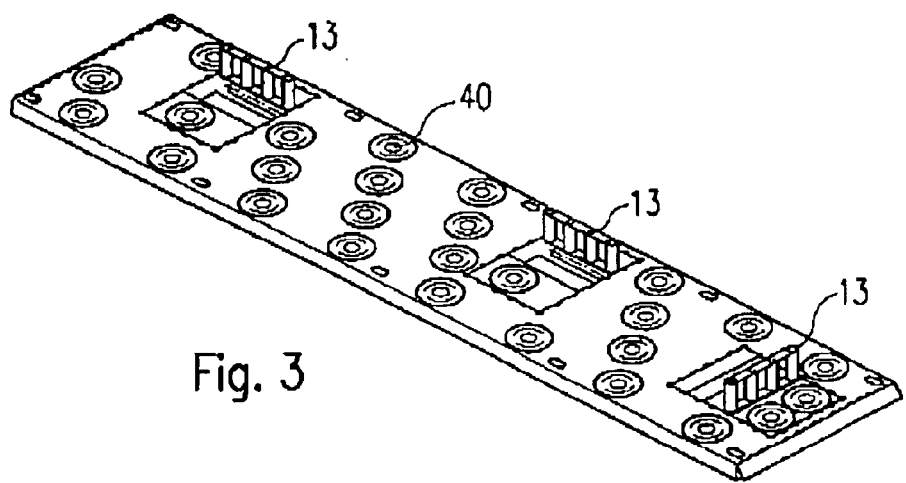
FIG. 3 is a perspective view of another form of mounting apparatus that is intended to facilitate the loading of freight.

The apparatus shown in FIG. 3 is a ball mat additionally provided with guide rollers 13 that rotate about vertical axes. With such guide rollers 13 even heavy freight items can be conveyed to their storage sites in a precise and risk-free manner. When they are not in use, the guide rollers 13 can be folded down below the loading plane.

What is claimed is:

1. Mounting apparatus for a functional unit of a transportation system comprising:
    a first type of retaining device and a second type of retaining device both retaining devices being attached to a floor of a cargo hold in an aircraft,
    a support base provided on a first side thereof with a first fixation device and on an opposite side thereof with a second fixation device,
    wherein the first and the second fixation devices and said first and said second retaining devices are of different constructions and the first fixation device is constructed to attach to the first retaining device and the second fixation device is constructed to attach to the second retaining device.

2. Mourning apparatus as claimed in claim 1, wherein the first and second fixation devices are constructed so that they can support loads imposed at least in part from different directions.

3. Mounting apparatus as claimed in claim 1, wherein the first type of retaining device is a seat rail and the second type of retaining device is a lock tray.

4. Mounting apparatus for a functional unit of a transportation system which can be attached to the floor of a cargo hold in an aircraft by means of a retaining device attached to the floor, and comprising a support base provided on opposite sides thereof with fixation devices of different constructions, a first one of said fixation devices constructed to attach to a first type of retaining device and a second one of said fixation devices constructed to attach to a second type of retaining device, wherein the first type of retaining device is different from the second type of retaining device, and
    wherein the support base comprises an adapter provided with a predetermined spacing raster, so that the functional unit can be mounted on the support base in such a fashion as to subdivide a predetermined raster dimension of the first and second retaining devices to adapt the functional unit's position to a predetermined dimension of an item of freight.

5. Mounting apparatus as claimed in claim 1, wherein at least one of the first or second fixation devices comprises a plurality of individual fixation elements, wherein each fixation element is constructed to be coupled individually to fixation counterparts on associated retaining devices.

6. Mounting apparatus as claimed in claim 5, wherein the individual fixation elements can be independently coupled and can be independently inactivated.

7. Mounting apparatus as claimed in claim 5, wherein, the individual fixation elements each comprise a spring-loaded pin which can engage a fixation counterpart comprising a bore defined in an associated retaining device.

8. Mounting apparatus as claimed in claim 1, wherein at least one side of both the first and second fixation devices are provided for employment as desired.

9. Mounting apparatus for a functional unit of a transportation system which can be attached to the floor of a cargo hold in an aircraft by means of a retaining device attached to the floor, and comprising a support base provided on opposite sides thereof with fixation devices of different constructions, a fiat one of said fixation devices constructed to attach to a first type of retaining device and a second one of said fixation devices constructed to attach to a second type of retaining device, wherein the first type of retaining device is different from the second type of retaining device, and
    wherein the support base comprises mounting devices for conveyor ball elements in addition to other functional units.

10. A method of retaining freight in an aircraft comprising the step of mounting the apparatus of claim 1 to a cargo hold such that items of freight are retained in a center-line region of a cargo hold for transport.

11. Mounting apparatus as claimed in claim 9, wherein at least one side of both the first and second fixation devices are provided for employment as desired.

12. A method of retaining freight in an aircraft comprising the step of mounting the apparatus of claim 9 to a cargo hold such that items of freight are retained in a center-line region of a cargo hold for transport.

13. Mounting apparatus as claimed in claim 4, wherein the first and second fixation devices are constructed so that they can support loads imposed at least in part from different directions.

14. Mounting apparatus as claimed in claim 4, wherein the first type of retaining device is a seat rail and the second type of retaining device is a lock tray.

15. Mounting apparatus as claimed in claim 4, wherein at least one of the first or second fixation devices comprises a plurality of individual fixation elements, wherein each fixation element is constructed to be coupled individually to fixation counterparts on associated retaining devices.

16. Mounting apparatus as claimed in claim 15, wherein the individual fixation elements can be independently coupled and can be independently inactivated.

17. Mounting apparatus as claimed in claim 15, wherein, the individual fixation elements each comprise a spring-loaded pin which can engage a fixation counterpart comprising a bore defined in an associated retaining device.

18. Mounting apparatus as claimed in claim 4, wherein at least one side of both the first and second fixation devices are provided for employment as desired.

19. A method of retaining freight in an aircraft comprising the step of mounting the apparatus of claim 4 to a cargo hold such that items of freight are retained in a center-line region of a cargo hold for transport.

20. Mounting apparatus as claimed in claim 9, wherein the first and second fixation devices are constructed so that they can support loads imposed at least in part from different directions.

21. Mounting apparatus as claimed in claim 9, wherein the first type of retaining device is a seat rail and the second type of retaining devise is a lock tray.

22. Mounting apparatus as claimed in claim 9, wherein at least one of the first or second fixation devices comprises a plurality of individual fixation elements, wherein each fixation element is constructed to be coupled individually to fixation counterparts on associated retaining devices.

23. Mounting apparatus as claimed in claim 22, wherein the individual fixation elements can be independently coupled and can be independently inactivated.

24. Mounting apparatus as claimed in claim 22, wherein, the individual fixation elements each comprise a spring-loaded pin which can engage a fixation counterpart comprising a bore defined in an associated retaining device.

* * * * *